United States Patent [19]

Brown

[11] 4,279,510
[45] Jul. 21, 1981

[54] SPECTROPHOTOMETER WITH IMPROVED PHOTOMULTIPLIER TUBE DARK SIGNAL COMPENSATION

[75] Inventor: James R. Brown, Garden Grove, Calif.

[73] Assignee: Beckman Instruments, Inc., Fullerton, Calif.

[21] Appl. No.: 86,389

[22] Filed: Oct. 19, 1979

[51] Int. Cl.³ .............................................. G01J 3/00
[52] U.S. Cl. ...................... 356/319; 250/207; 356/326 330/129; 330/259; 356/300
[58] Field of Search ...................... 356/300, 319–334; 250/207; 330/9, 259, 129, 144, 284

[56] References Cited

U.S. PATENT DOCUMENTS

| | | | |
|---|---|---|---|
| 2,253,976 | 8/1941 | Guanella | 330/9 |
| 3,684,378 | 8/1972 | Lord | 356/323 |

Primary Examiner—Vincent P. McGraw
Attorney, Agent, or Firm—Robert J. Steinmeyer; Robert R. Meads

[57] ABSTRACT

In a spectrophotometer including a photomultiplier tube responsive to light for producing an analog current proportional to the intensity thereof, an analog-to-digital converter, a signal path from the photomultiplier tube to the analog-to-digital converter, the analog-to-digital converter producing a digital signal as a function of the analog current, and computer means responsive to the digital signal for generating a signal for compensating for the dark current of the photomultiplier tube, there is disclosed a method and means for reducing the dark current correction error by temporarily increasing the gain of the signal path during calculation of the value of the compensating signal.

8 Claims, 2 Drawing Figures

SPECTROPHOTOMETER WITH IMPROVED PHOTOMULTIPLIER TUBE DARK SIGNAL COMPENSATION

BACKGROUND OF THE INVENTION

1. Field of the Invention

The present invention relates to a method and means for compensating for the photomultiplier tube dark signal in a spectrophotometer and, more particularly, to a method and means for reducing the error when compensating for a photomultiplier tube dark signal in a spectrophotometer.

2. Description of the Prior Art

In a spectrophotometer, a beam of light of a known frequency is transmitted through a sample and a photomultiplier tube is positioned to detect the light passing through the sample. The less light absorbed by the sample, the more light is transmitted, and the output of the photomultiplier tube is a current signal proportional to the intensity of the detected light. Thus, the output of the photomultiplier tube is proportional to transmittance.

An operational amplifier is typically used to convert this current signal into a DC voltage signal. Such an operational amplifier typically has inverting and non-inverting inputs and an output whereupon the current from the photomultiplier tube is applied to the inverting input of the operational amplifier. The amplifier produces a DC voltage which is also proportional to transmittance.

Under dark conditions, when there should be no light falling on the photomultiplier tube, there is still a current flowing therethrough, referred to as the dark current, and this dark current produces a proportional voltage at the output of the operational amplifier. If not compensated for, such current and the corresponding output voltage would result in a signal offset and a consequent error when measuring light falling on the tube. Thus, in a spectrophotometer, the signal path from the photomultiplier tube is typically compensated for to reduce the dark voltage to zero.

If the analog signal from the photomultiplier tube is eventually digitized for automatic computer control of dark current offset compensation, an analog-to-digital converter (ADC) must be used. Such an ADC must be capable of converting the entire range of signals of interest during operation of the spectrophotometer and has, by its very nature, a measurement error of $\pm 1/2x$, where x is the smallest analog step resolvable by the ADC.

Assuming a perfectly nulled dark current offset, then, light signal measurements as digitized by the ADC will be accurate with an error of $\pm 1/2x$. But, if the same ADC is used to measure the small dark signal for corrective purposes, the dark current compensation may also be in error by $\pm 1/2x$. This error, combined with the $\pm 1/2x$ error introduced in making later measurements, results in a possible signal measurement error of $\pm x$, twice the error of the ADC.

SUMMARY OF THE INVENTION

According to the present invention, there is provided a method and means for compensating for the dark current of a photomultiplier tube which substantially reduces the dark current correction error so as to maintain the maximum allowable accuracy of an analog-to-digital converter. Following the teachings of the present invention, an analog-to-digital converter can resolve and thus permit compensation of the dark current with an error of $\pm 1/2nx$. Since n can be substantial, the error in signal measurements introduced by dark current compensation can be effectively reduced to near zero.

Briefly, in a spectrophotometer including a source of light, a photomultiplier tube responsive to the light for producing an analog current proportional to the intensity thereof, an analog-to-digital converter, a signal path from the photomultiplier tube to the analog-to-digital converter, the analog-to-digital converter producing a digital signal as a function of the analog current, and calculator means responsive to the digital signal for generating a signal for compensating for the dark current of the photomultiplier tube, the present invention comprises a method and means for reducing the dark current correction error by increasing the gain of the signal path by a factor of n during calculation of the value of the compensating signal. This allows the analog-to-digital converter to resolve and thus permit compensation of the dark current within an error of $\pm 1/2nx$ so that subsequent measurements by the spectrophotometer have an error of $\pm 1/2x \pm 1/2nx$.

OBJECTS, FEATURES, AND ADVANTAGES

It is therefore an object of the present invention to solve the problems resulting from the presence of an error when compensating for the dark current of a photomultiplier tube. It is a feature of the present invention to solve these problems by temporarily increasing the gain, by a factor of n, for the signal path from the photomultiplier tube to an analog-to-digital converter during calculation of the value of the compensating signal. An advantage to be derived is that the dark current correction error is significantly reduced, by the factor of n. A still further advantage is that the analog-to-digital converter can resolve the dark current with an error of $\pm 1/2nx$. Another advantage is that the combined error introduced by the analog-to-digital converter is the minimum possible.

Still other objects, features, and attendant advantages of the present invention will become apparent to those skilled in the art from a reading of the following detailed description of the preferred embodiments constructed in accordance therewith, taken in conjunction with the accompanying drawings wherein:

DESCRIPTION OF THE PREFERRED EMBODIMENTS

Figure 1:
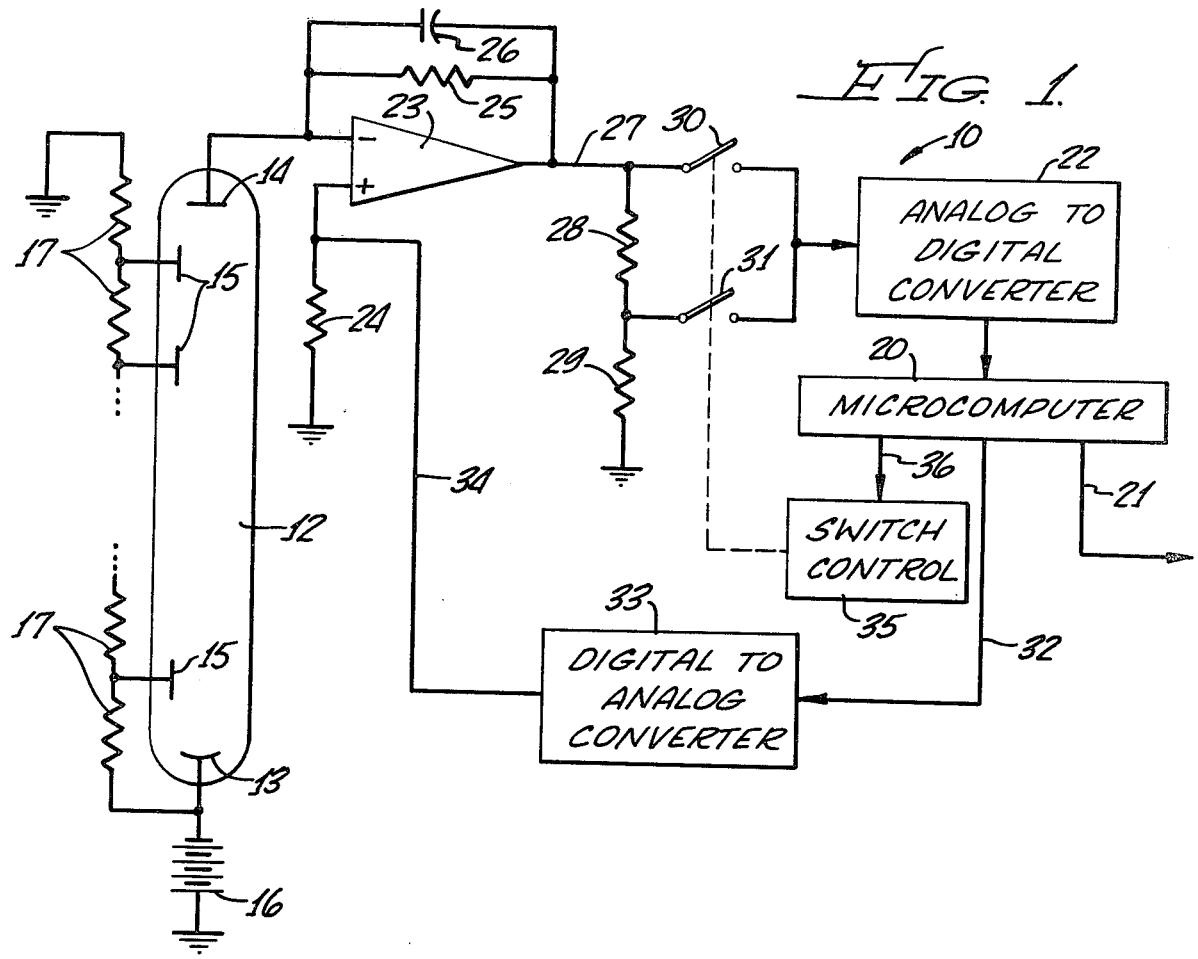
FIG. 1 is a block diagram of apparatus constructed in accordance with the teachings of the present invention.

Referring now to the drawings and, more particularly, to FIG. 1 thereof, there is shown spectrophotometer apparatus, generally designated 10, constructed in accordance with the teachings of the present invention. Apparatus 10 includes a technique for simultaneously compensating for the dark current of a photomultiplier tube and the offset of an operational amplifier so that the output voltage of the operational amplifier is zero volts under dark conditions. This technique is described and claimed in the copending application of James R.

Brown and Al Diamond, Ser. No. 86,388, filed Oct. 19, 1979, and assigned to Beckman Instruments, Inc., the assignee of the present application. Since this technique is, generally speaking, the preferred method of compensating for the dark current of a photomultiplier tube in a spectrophotometer, it will be utilized herein in describing the present invention. However, the teachings of the present invention are not limited to such compensation technique.

Apparatus 10 includes a conventional photomultiplier tube 12 including a cathode 13, an anode 14, and a plurality of dynodes 15. Cathode 13 is connected to one terminal of a voltage source 16, the other terminal of which is connected to ground. Bias for dynodes 15 is provided by means of a plurality of resistors 17 connected in series between voltage source 16 and ground. The taps between resistors 17 are connected to dynodes 15. This is a conventional means of biasing a photomultiplier tube.

Anode 14 of photomultiplier tube 12 provides a current which is proportional to the intensity of light detected by tube 12. Under dark conditions, there is still a current flowing therethrough, referred to as the dark current. Such current results in a signal offset which will cause an error when measuring light falling on tube 12.

According to present invention, the current from tube 12 is preferably digitized for automatic computer control. That is, the signal from tube 12 is eventually conducted to a microcomputer 20 which may be any of the conventional types presently on the market having storage, calculation, and instruction issuing capabilities. Microcomputer 20 is capable of producing, on a line 21, an output signal indicative of light intensity as detected by photomultiplier tube 12.

In order to digitize the analog signal from tube 12, apparatus 10 includes an analog-to-digital converter 22 which has, by its nature, a measurement error of $\pm 1/2x$, where x is the smallest analog step resolvable by ADC 22. Apparatus 10 includes a signal path from anode 14 of photomultiplier tube 12 to ADC 22. According to the preferred embodiment of the present invention, this signal path includes an operational amplifier 23 which functions as a preamplifier, amplifier 23 having inverting and non-inverting inputs and an output. The inverting input of amplifier 23 is connected to anode 14 of tube 12. According to the invention of the before-mentioned copending application of Brown and Diamond, the non-inverting input of amplifier 23 is connected via a resistor 24 to ground. The output of operational amplifier 23 is fed back to the inverting input thereof, typically by means of a resistor 25 and a capacitor 26.

According to the present invention, the output of operational amplifier 23 on line 27 is connected to a voltage divider network consisting of a pair of resistors 28 and 29 connected between line 27 and ground. The output of operational amplifier 23 on line 27 and the junction between resistors 28 and 29 are connected to first ends of switches 30 and 31, respectively, the other ends of which are connected to the input of analog-to-digital converter 22.

As described in the before-mentioned copending application of Brown and Diamond, microcomputer 20 is capable of generating, on a line 32, the digital equivalent of a current for compensating for the dark current signal of photomultiplier tube 12 and the offset of operational amplifier 23. This signal is applied via a digital-to-analog converter 33 to the non-inverting input of amplifier 23. Digital-to-analog converter 33 converts the digital signal on line 32 to an analog current on a line 34 which passes through resistor 24 to ground and generates a reference voltage at the non-inverting input of amplifier 20.

Thus, during dark signal compensation generation, microcomputer 20 can calculate the value of a dark current compensation signal, apply same to amplifier 23, and sense the output of amplifier 23 to determine whether the output of amplifier 23 has been reduced to zero. Corrective iterations may be made rapidly, at the speed commonly encountered with microcomputers.

According to the present invention, the gain of the signal path from photomultiplier tube 12 to ADC 22 may be controlled by closing switch 30 or 31. During normal measurements, switch 31 is closed and switch 30 is open so that only a portion of the output of operational amplifier 23 is applied to ADC 22. Alternatively, the gain of the signal path can be increased by closing switch 30 and opening switch 31 to apply the full output voltage of amplifier 23 to ADC 22. The opening and closing of switches 30 and 31 is controlled by a switch control 35 which receives control signals from microcomputer 20 over lines 36.

In operation, assuming a perfectly nulled dark current offset, then, light signal measurements as digitized by ADC 22 will be accurate within an error of $\pm 1/2x$, where x is the smallest analog step resolvable by ADC 22. But, if the same ADC 22 is used to measure the small dark signal for corrective purposes, the dark current compensation may also be in error by $\pm 1/2x$. This error, combined with the $\pm 1/2x$ error in making any later measurements, results in a possible signal measurements error of $\pm x$, twice the error of ADC 22.

According to the present invention, to reduce the dark current correction error, the signal path from photomultiplier tube 12 to ADC 22 is modified to temporarily increase the path gain by a factor of n, where n may be any number and is not necessarily an integer. According to the embodiment of FIG. 1, during the calculation of the value of the compensating signal, microcomputer 20 signals switch control 35 over line 36 to open switch 31 and close switch 30. This applies the full voltage output of operational amplifier 23 to ADC 22. Assuming that the path gain is increased by a factor of n, ADC 22 can now resolve and permit compensation of the dark current with an error of $\pm 1/2nx$.

By way of example, if ADC 22 has a fundamental measurement error of $\pm 0.5$ mv and n is 10, ADC 22 can now resolve and permit compensation of the dark current within an error of $\pm 0.05$ mv. The total measurement error of ADC 22 in making later measurements is now $\pm 0.55$ mv which, for all practical purposes, is the same as its fundamental measurement error.

Figure 2:
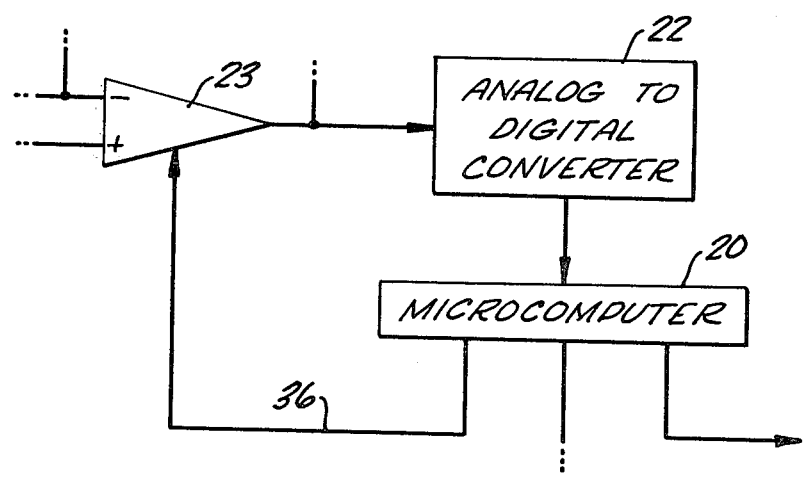
FIG. 2 is a partial block diagram of an alternative embodiment of the present invention.

According to the embodiment of FIG. 2, resistors 28 and 29, switches 30 and 31, and switch control 35 may be eliminated if operational amplifier 23 has an adjustable gain. In other words, according to the embodiment of FIG. 2, the output of microcomputer 20 on line 36 is fed back to the gain adjustment control of amplifier 23 to increase the gain thereof during the calculation of the dark current compensation signal. Other methods for temporarily increasing the path gain will be obvious to those skilled in the art.

It can therefore be seen that according to the present invention, there is provided a method and means for compensating for the dark current of photomultiplier tube 12 which substantially reduces the dark current correction error so as to maintain the maximum allowable accuracy of analog-to-digital converter 22. Following the teachings of the present invention, analog-to-digital converter 22 can resolve and thus permit compensation of the dark current within an error of ±1/2nx. Since n can be substantial, the error in signal measurements introduced by dark current compensation can be effectively reduced to near zero.

While the invention has been described with respect to the preferred physical embodiments constructed in accordance therewith, it will be apparent to those skilled in the art that various modifications and improvements may be made without departing from the scope and spirit of the invention. For example, while the present invention has been described as a method and means for compensating for the photomultiplier tube dark signal in a spectrophotometer, it will be apparent that it has applicability to other circuits where an analog-to-digital converter and computer means are used for generating a signal for compensating for the offset of an input means under zero conditions. Accordingly, it is to be understood that the invention is not to be limited by the specific illustrative embodiments, but only the scope of the appended claims.

I claim:

1. In a spectrophotometer including a source of light, a detector responsive to said light for producing an analog signal proportional to the intensity thereof, an analog-to-digital converter, a signal path from said photomultiplier tube to said converter, said converter producing a digital signal as a function of said analog signal, and calculator means responsive to said digital signal for generating a signal for compensating for the dark current of said photomultiplier tube, the improvement comprising:

means for increasing the gain of said signal path by a factor of n during calculation of the value of said compensating signal.

2. In a spectrophotometer according to claim 1, wherein said signal path includes an amplifier, the improvement wherein said gain increasing means comprises:

means for increasing the effective gain of said amplifier.

3. In a spectrophotometer according to claim 1, wherein said signal path includes means for converting said analog current to a voltage, the improvement wherein said gain increasing means comprises:

circuit means for multiplying said voltage from said converting means by said factor n.

4. In a spectrophotometer including a source of light, a detector responsive to said light for producing an analog signal proportional to the intensity thereof, an analog-to-digital converter, a signal path from said photomultiplier tube to said converter, said converter producing a digital signal as a function of said analog signal and calculator means responsive to said digital signal for generating a signal for compensating for the dark current of said photomultiplier tube, a method for reducing the error in generating said dark current compensating signal, comprising the step of:

increasing the gain of said signal path during calculation of the value of said compensating signal.

5. In a spectrophotometer according to claim 4, wherein said signal path includes an amplifier, the method wherein said gain increasing step comprises:

increasing the effective gain of said amplifier.

6. In a spectrophotometer according to claim 4, wherein said signal path includes means for converting said analog current to a voltage, the method wherein said gain increasing step comprises:

multiplying said voltage from said converting means by said factor n.

7. In a circuit including input means for producing an analog signal, an analog-to-digital converter, a signal path from said input means to said converter, said converter producing a digital signal as a function of said analog signal, and calculator means responsive to said digital signal for generating a signal for compensating for the offset of said input means, the improvement comprising:

means for increasing the gain of said signal path by a factor of n during calculation of the value of said compensating signal.

8. In a circuit including input means for producing an analog signal, an analog-to-digital converter, a signal path from said input means to said converter, said converter producing a digital signal as a function of said analog signal, and calculator means responsive to said digital signal for generating a signal for compensating for the offset of said input means, a method for reducing the error in generating said compensating signal, comprising the step of:

increasing the gain of said signal path during calculation of the value of said compensating signal.

* * * * *